Patented Oct. 16, 1934

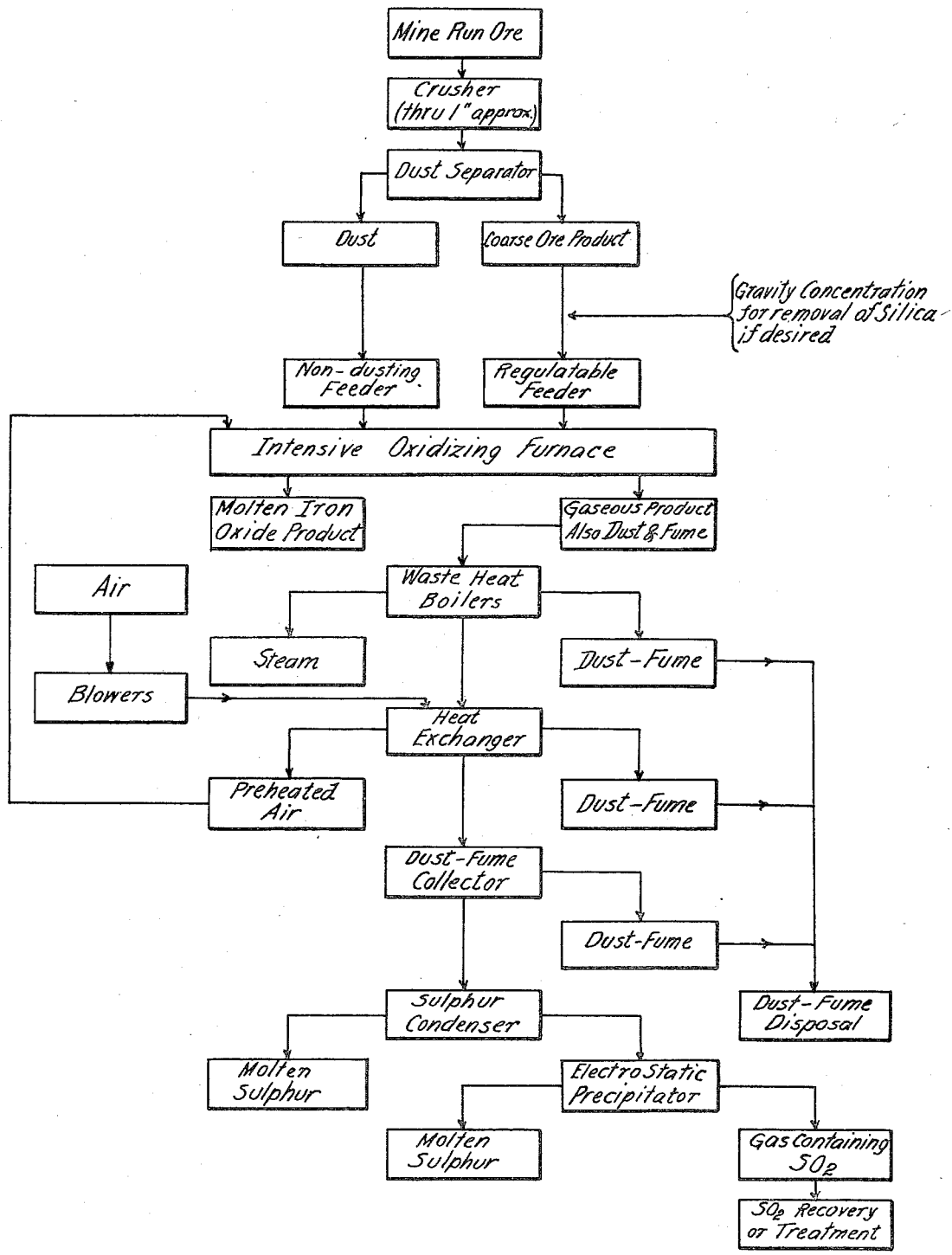

1,976,736

UNITED STATES PATENT OFFICE 1,976,736

RECOVERY OF SULPHUR FROM SULPHIDE ORES

Charles R. Kuzell, Clarkdale, Ariz.

Application December 28, 1932, Serial No. 649,170

9 Claims. (Cl. 75—60)

This invention relates to the treatment of iron sulphide ore, such as pyrites, and has for its object an improved method of treating such an ore for the recovery of a large proportion of its sulphur and/or iron contents in utilizable or marketable forms. While the invention is peculiarly amenable to the treatment of ordinary run-of-mine ore, it may be advantageously applied to the treatment of concentrates and other mineral and metallurgical products containing sulphides of iron, and throughout this specification and the appended claims I have used the term "ore" to include and cover all such products.

In my copending application for Letters Patent of the United States, Serial No. 505,250; filed December 29, 1930, I have disclosed a process for the pyrometallurgical dissection of sulphide ores involving alternate oxidizing and reducing operations in the course of which the metals and metalloids in the ore are selectively isolated and recovered substantially in their entirety as marketable commercial products. In that process, the ore is initially subjected to intensive oxidation, with the production of a gaseous product containing the bulk of the sulphur and a molten product containing iron oxides and other non-volatilizable constituents of the ore. By intensive oxidation, I mean the efficient and energetic utilization of oxygen accompanied by effective utilization and conservation of the exothermic heat of reaction until the suitably confined charge has in its entirety undergone oxidation to the desired endpoint. With such intensive oxidation dilution of the gaseous product with excess oxygen is avoided and the available heat is used most profitably. The intensity of oxidation may be supplemented or increased in degree by preheating the oxidizing medium and/or the ore, by enrichment of the medium in oxygen, by heat-insulating the apparatus, or by any combination of these factors.

My present invention is primarily concerned with the recovery of sulphur in utilizable or marketable form from pyrites and other sulphide ores containing iron. The invention is further concerned, more particularly when treating pyrites, with the recovery of a marketable iron product, such as a high grade iron oxide concentrate or metallic iron. In accordance with the invention, the sulphide ore is subjected to intensive oxidation until the resulting oxidized iron is melted by the exothermic heat of reaction, and preferably until a substantial amount of iron has been oxidized to magnetite, thereby effecting a substantially complete elimination of sulphur from the ore. The intensive oxidation may be conducted under conditions that avoid or minimize oxidation of such part of the sulphur as is distilled or driven off from the ore as elemental sulphur, in consequence of the prevailing high temperature. It is well known that the feeble atom of pyrite ($FeS_2$) is readily distilled or driven off at temperatures around 700° C. (1200–1300° F.). At higher temperatures sulphur is distilled or driven off from the mono-sulphide of iron (FeS), the volatilization of sulphur increasing with the temperature and being substantially complete at 3000° C. The present invention, in one of its aspects, makes use of these facts in conjunction with the high exothermic heat of reaction incidental to intensive oxidation to liberate a large proportion of the sulphur (of the pyrite or other sulphide ore) in elemental form.

Thus, the invention involves intensive oxidation of a sulphide ore containing iron with the production of a gaseous product containing the bulk of the sulphur (with a substantial proportion thereof in elemental form, if desired) and a molten product containing iron oxide or oxides. The gaseous product is appropriately treated for the recovery of sulphur in marketable form, as, for example, in the form of elemental sulphur, sulphur dioxide, sulphuric acid etc. If the oxidation is terminated when the molten mass has reached the stage in which the iron is largely present as ferrous oxide (FeO) containing some ferrous sulphide (FeS) dissolved therein or chemically combined therewith, the sulphur will not have been completely eliminated and such an iron product (containing sulphur) is not desirable for subsequent manufacture of iron or steel. By continuing the oxidation beyond this stage, ferrous oxide is oxidized to magnetite ($Fe_3O_4$), and when such continued oxidation has proceeded until the molten mass contains a large proportion of magnetite, the sulphur will be completely eliminated therefrom. This phase of the oxidizing cycle (that is, oxidation of FeO to $Fe_3O_4$) is highly exothermic and effects a rapid and extensive rise in temperature by virtue of which the magnetite is maintained molten.

It is characteristic of the oxidizing operation of the invention that the ore charge undergoing intensive oxidation contains such an amount of natural fuel, such as iron sulphide, as to insure fusion of the resulting oxidized ore at the temperatures attained without the fluxing assistance of silica. While the ore may and usually will contain some silica, the amount of silica present is usually and preferably considerably less than required to form an iron silicate slag with all the iron present. Ferrous oxide and magnetite are depended upon to impart the desired fluidity to the oxidized ore, and silica is not present or included in the charge for the purpose of forming a slag with such iron oxides, as is customary in the ordinary practices of pyritic smelting. The intensive oxidation is preferably carried to the stage of considerable over-oxidation, that is, until considerable iron has been oxidized to magnetite. This permits the attainment of relatively higher temperatures, thereby effecting the complete elimination of sulphur and promoting the elimination (with subsequent recovery) of volatilizable constituents such as zinc, lead, cadmium, etc.

The intensive oxidation of the ore may be carried out by passing an oxidizing gas such as air through or in contact with a charge of the ore heated to a sufficiently high temperature to effect ready burning or oxidation of sulphides in the ore. In the course of this oxidizing treatment a substantial part of the sulphur content of the ore is distilled off in consequence of the prevailing high temperature and, under appropriate operating conditions, will be present in the gaseous product of the oxidizing operation in the form of elemental sulphur. The remaining sulphur content of the ore is burned or oxidized to sulphur dioxide, and iron is converted to oxides thereof, preferably with the formation of a considerable quantity of magnetic oxide of iron, thereby furnishing the requisite heat for the operation. The oxidizing treatment may be advantageously conducted by blowing an oxidizing gas, preferably preheated air, through a molten bath resulting from a preceding operation or resulting from the oxidizing treatment itself, raw ore being added continuously or intermittently to the operation and melted by the heat of the oxidizing reactions until an appropriate amount of molten oxidized ore has been formed. The oxidation is continued until substantially all of the sulphur has been removed from the ore, by distillation and oxidation, in the gaseous product of the operation. The iron will be present in the resulting molten bath largely in the form of magnetite with some ferrous oxide or ferrous silicate slag depending upon the amount of silica naturally present in the ore.

The molten iron oxide product of the oxidizing operation may be directly reduced, in an appropriate furnace, for the production of metallic iron, or may be cooled in any appropriate manner and disposed of as a high grade iron oxide concentrate. In case all of the volatilizable constituents of the ore are not completely volatilized under the conditions prevailing during the intensive oxidation, such part of these constituents as remain in the molten iron product may be removed and recovered by subsequent treatment, as for example, in succeeding fractional reducing operations. Such additional removal of the remaining volatilizable constituents is usually complete when, in the course of the reducing operation, the magnetite has been reduced back to ferrous oxide. At the same time non-volatilizable metals, such as copper etc. which may have been present in the ore, are reduced to metal and stratify with respect to ferrous oxide in the molten bath so that separation can be effected by pouring or tapping. The resulting iron oxide product in such case is ferrous oxide, which being the lower oxide is more amenable to subsequent treatment and is of higher iron content which increases its marketability when disposed of as an iron concentrate. Such a fractional reducing operation may be carried out by blowing a reducing gas or an atomized reducing agent through the molten iron oxide product of the oxidizing operation, and sufficient air, or other combustion supporting gas, may be admitted above the molten product to burn or oxidize such portion of the reducing gas or agent as passes unconsumed therethrough.

The gaseous product of the oxidizing operation will contain all of the sulphur in the ore. The sulphur may be present in the gaseous product entirely as sulphur dioxide, or a substantial proportion may be present as elemental sulphur, depending upon the ratio of oxygen (in the oxidizing medium) to combustible constituents (in the ore). Thus, the oxygen and combustible constituents may be so proportioned, by simple metallurgical calculation, that all of the sulphur in the ore is oxidized to sulphur dioxide. By decreasing the ratio of oxygen to combustible constituents, a large proportion of the sulphur that is distilled off from the ore at the prevailing temperatures escapes oxidation and remains in the gaseous product as elemental sulphur vapor. Accordingly, when it is desired to recover as much of the sulphur as possible in the elemental form, the ratio of oxygen to combustible constituents is reduced to the minimum compatible with successful conduct of the intensive oxidizing treatment. Elemental sulphur in the gaseous product is removed therefrom by condensation. Sulphur dioxide in the gaseous product may be reduced in any appropriate manner and the resulting elemental sulphur condensed and recovered, or the sulphur dioxide may be directly utilized (as for example in the manufacture of sulphuric acid, sulphite liquor, etc.), or the sulphur dioxide may be removed from the gaseous product as such, and, if desired, liquefied.

The single figure of the accompanying drawing is a flow-sheet of an operation embodying the invention. Raw run-of-mine pyrite or sulphide ore is appropriately crushed, say to pass through a one-inch mesh screen. It is advantageous to separate the dust from the crushed ore in order to facilitate feeding of the crushed ore into the oxidizing furnace and in order to avoid dusting nuisance. The dust is then separately fed into the furnace through any appropriate non-dusting type of feeder, and the substantially dust-free crushed ore is also separately fed into the furnace through an appropriate type of feeder therefor.

The oxidizing furnace may advantageously be a tilting furnace resembling generally the barrel type copper converter, such as illustrated and described in my aforementioned application. This particular type of furnace is to be taken merely as illustrative of suitable apparatus for the practice of the invention, various other forms and types of apparatus being available therefor. A small amount of the final molten charge of the preceding operation may be retained in the furnace, the furnace being highly heated as a result of the preceding operation. The tilting furnace is positioned so that its tuyères are covered to a sufficient depth with the molten mass within the furnace, and the oxidizing gas, such for example as preheated air, is blown through the tuyères into the furnace, say at a pressure of 10 to 20 pounds. At the same time, crushed ore is fed into the furnace at approximately the rate at which the heat developed within the furnace will fuse or melt the ore.

The throat or gas exit of the furnace communicates through a gas-tight connection with a closed flue system including the sulphur recovery apparatus. The gaseous product of the intensive oxidation, having a temperature of from 2100 to 2700° F., is conducted from the oxidizing furnace to waste heat boilers, where a portion of its heat energy is utilized to generate steam. Sufficient heat is retained in the gaseous product exiting from these boilers to preheat (in an appropriate heat exchanger) the air, or other oxidizing medium, used in the intensive oxidation operation, say to a temperature of approximately 1000° F. The gaseous product, now cooled to a temperature just above the dew-point of elemental sulphur, is next passed through a baghouse or other dust and fume collecting apparatus. The gas exiting from the fume collecting apparatus is dust-free and contains substantially all of the sulphur originally present in the sulphide ore.

Where the oxidizing operation has been conducted for the oxidation of all the sulphur to sulphur dioxide, the dust-free gas will consist for the most part of nitrogen and sulphur dioxide (about 14 to 15% $SO_2$) and may be directly utilized for the manufacture of sulphuric acid. The sulphur dioxide may be concentrated, thereby permitting the production of marketable nitrogen gas, and the concentrated sulphur dioxide may be appropriately treated, preferably for the recovery of sulphur in elemental form. Concentration of the sulphur dioxide gas is not necessary since the gas exiting from the fume-collecting apparatus may be directly subjected to appropriate treatment for the recovery of its sulphur content as elemental sulphur, or (as previously mentioned) as sulphuric acid, or as any other marketable sulphur product.

Where the oxidizing operation has been conducted to avoid or minimize oxidation of such part of the sulphur as is distilled from the ore, the gas exiting from the fume-collecting apparatus will contain a substantial amount of elemental sulphur vapor. Under such circumstances, the gas is passed through a sulphur condenser in which a large part of the elemental sulphur vapor is condensed to molten sulphur. The gas exiting from the sulphur condenser is preferably passed through an electrostatic precipitator for removing therefrom such sulphur vapor as escaped condensation in the condenser. The gas exiting from the precipitator (at a temperature of about 120—140° C.) will contain, in the form of sulphur dioxide, the remainder of the sulphur content of the ore. This gas may be subjected to any appropriate treatment for the utilization or recovery of its sulphur dioxide content, such, for example, as the procedures hereinbefore mentioned.

The dust and fume removed from the gaseous product of the oxidizing operation in the waste heat boiler in the heat exchanger and in the fume collecting apparatus are collected and appropriately treated for the recovery of their valuable metallic constituents, such, for example, as zinc, lead, cadmium, selenium, etc.

Pyritic ores may advantageously be treated in accordance with the invention for the production of sulphur dioxide for utilization in the manufacture of sulphuric acid, sulphite liquor, etc. The gaseous product of the oxidizing operation is of relatively high sulphur dioxide content (14–15% $SO_2$) and is practically free of oxygen. Furthermore, the invention effects substantially complete removal of sulphur from the ore. Where the ore contains valuable metals, such as copper, zinc, lead, etc., these are recoverable in the practice of the invention as hereinbefore described, and as more particularly set forth in my aforementioned application. Where it is advantageous to recover the sulphur in elemental form, the oxidizing operation may be readily conducted, by properly proportioning the oxygen of the oxidizing medium to the combustible constituents in the ore, to produce a gaseous product in which a large proportion (over half) of the sulphur is present as elemental sulphur vapor. Such sulphur dioxide as is inevitably present in the gaseous product may be reduced to elemental sulphur, preferably following condensation of sulphur vapor normally present in the gaseous product, although if desired the reduction of sulphur dioxide may be effected before the gaseous product is conducted to the sulphur condensing apparatus.

I claim:

1. The method of treating a sulphide ore containing iron for the recovery of sulphur therefrom which comprises subjecting the ore to intensive oxidation until the ore is melted by the exothermic heat of reaction and a molten bath containing the resulting oxidized iron is formed, and subjecting the gaseous product of the oxidizing operation to appropriate treatment for the recovery of its sulphur content.

2. The method of treating a sulphide ore containing iron for the recovery of sulphur therefrom which comprises subjecting the ore to intensive oxidation until the ore is melted by the heat of reaction and in the presence of insufficient silica to form an iron silicate slag with the resulting oxide or oxides of iron, and subjecting the gaseous product of the oxidizing operation to appropriate treatment for the recovery of its sulphur content.

3. The method of treating a sulphide ore containing iron for the recovery of sulphur therefrom which comprises subjecting the ore to intensive oxidation until the ore is melted by the heat of reaction and a molten bath containing a substantial amount of the iron in the form of magnetite is produced, and subjecting the gaseous product of the oxidizing operation to appropriate treatment for the recovery of its sulphur content.

4. In a process for recovering sulphur from a sulphide ore containing iron involving oxidation of the ore to form an iron oxide product and a gaseous product from which sulphur is recoverable in utilizable form, the improvement which comprises melting the ore by the heat of the oxidizing reaction, and continuing the oxidizing treatment until a large proportion of the iron is in the form of molten magnetite thereby effecting a substantially complete elimination of sulphur from the ore.

5. The method of treating a sulphide ore containing iron for the recovery of sulphur therefrom which comprises subjecting the ore to intensive oxidation until a substantial amount of iron has been oxidized to magnetite and melted, said oxidizing operation being conducted to distill off a substantial amount of sulphur in elemental form without subsequent oxidation thereof, and subjecting the gaseous product of the oxidizing operation to appropriate treatment for the condensation therefrom of elemental sulphur vapor and the recovery therefrom of sulphur dioxide.

6. The method of treating a sulphide ore containing iron with the recovery of sulphur therefrom which comprises subjecting the ore to intensive oxidation in the presence of insufficient silica to combine with all of the oxidized iron and continuing the oxidation until the ore is molten and a large proportion of magnetite has been formed, whereby substantially all of the sulphur in the ore is eliminated in the gaseous product of the oxidizing operation and a high grade iron-oxide product is produced, and treating the gaseous product to recover sulphur therefrom in utilizable form.

7. The method of treating a sulphide ore containing iron which comprises charging the ore into a molten bath containing a large proportion of iron oxide and blowing an oxidizing gas through said bath until all of the ore charged has been melted and a large proportion of iron has been oxidized to magnetite, and treating the gaseous product of said operation to recover sulphur therefrom in utilizable form.

8. The method of treating a sulphide ore containing iron which comprises charging the ore into a molten bath containing a large proportion of iron oxide and blowing an oxidizing gas through said bath in such amount with respect to the combustible constituents in the ore that only part of the sulphur in the ore is converted to sulphur dioxide while the remaining sulphur in the ore is distilled off as sulphur vapor in consequence of the prevailing high temperature, continuing the blowing of air through said bath until all of the ore charge has been melted and a large proportion of iron has been oxidized to magnetite, and subjecting the gaseous product of said operation to appropriate treatment for the condensation therefrom of sulphur vapor and the recovery therefrom of sulphur dioxide.

9. The method of treating a sulphide ore containing iron which comprises charging the ore into a bath of oxidized molten ore and blowing a preheated oxidizing gas through said bath until all of the ore charge has been melted and a large proportion of iron has been converted to magnetite with substantially complete elimination of sulphur in the resulting gaseous product of the operation, and treating said gaseous product to recover sulphur therefrom in utilizable form.

CHARLES R. KUZELL.